United States Patent
Maruoka

(10) Patent No.: US 7,461,679 B2
(45) Date of Patent: Dec. 9, 2008

(54) HEAVY DUTY TIRE

(75) Inventor: Kiyoto Maruoka, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 100 days.

(21) Appl. No.: 11/517,447

(22) Filed: Sep. 8, 2006

(65) Prior Publication Data

US 2007/0102091 A1     May 10, 2007

(30) Foreign Application Priority Data

Nov. 8, 2005   (JP)   ............................. 2005-323871

(51) Int. Cl.
*B60C 15/00*   (2006.01)
*B60C 15/06*   (2006.01)

(52) U.S. Cl. .................... 152/539; 152/450; 152/541; 152/552; 152/554

(58) Field of Classification Search ................. 152/539, 152/541, 552, 554, 450
See application file for complete search history.

(56) References Cited

U.S. PATENT DOCUMENTS

| | | | | |
|---|---|---|---|---|
| 5,107,915 A | * | 4/1992 | Shimomura et al. | ......... 152/543 |
| 2005/0126675 A1 | * | 6/2005 | Maruoka et al. | ............ 152/543 |
| 2005/0150583 A1 | * | 7/2005 | Maruoka et al. | ............ 152/552 |

FOREIGN PATENT DOCUMENTS

JP         2005-170145 A     6/2005

* cited by examiner

*Primary Examiner*—Justin Fischer
(74) *Attorney, Agent, or Firm*—Birch, Stewart, Kolasch & Birch, LLP

(57) ABSTRACT

A heavy duty tire having a bead wind structure and comprising a bead reinforcing layer 15 having a U-shaped cross section disposed in each bead portion 4, wherein the axially outer portion 15o of the bead reinforcing layer 15 and its radially outer end Pe are protected by an axially inner rubber 20 disposed between the carcass main portion 6a and the outer portion 15o and an axially outer rubber 30 disposed between the outer portion 15o and the axially outer surface TS of the tire, in which the inner rubber 20 includes a first low modulus rubber portion 21 having a complex elastic modulus of 3.0 to 6.0 MPa, the thickness Ti of the inner rubber 20 measured on a first base line X1 drawn from the radially outer end Pe at right angles to the carcass main portion 6a is from 7.0 to 13.0 mm and the ti/Ti ratio of a thickness ti of the first low modulus rubber portion 21 on the first base line X1 to the thickness Ti is at least 0.9; and in which the outer rubber 30 includes a second low modulus rubber portion 31 having a complex elastic modulus of 3.0 to 6.0 MPa, the thickness To of the outer rubber 30 measured on a second base line X2 drawn from the radially outer end Pe at right angles to the axially outer surface TS of the tire is from 5.0 to 11.0 mm and the to/To ratio of a thickness "to" of the second low modulus rubber portion 31 on the second base line X2 to the thickness To is at least 0.4. The weight of the bead portion can be reduced while maintaining the bead durability.

8 Claims, 5 Drawing Sheets

PRIOR ART

HEAVY DUTY TIRE

BACKGROUND OF THE INVENTION

The present invention relates to a heavy duty tire, more particularly to a heavy duty tire having a bead structure capable of reducing the tire weight without deteriorating the bead durability.

A carcass ply which forms the skeleton of a pneumatic tire is usually anchored by turning up the both end portions of the ply around a pair of opposing bead cores. In recent years, a so-called bead wind structure is proposed as disclosed, for instance, in JP-A-2005-170145, wherein as shown in FIG. 5 each of turnup portions a1 of a carcass ply "a" is wound around a bead core "b" approximately one round. Since the turnup portion a1 terminates in the vicinity of the bead core "b", a stress applied when the bead is deformed scarcely acts on the terminal end a1e of the turnup portion a1 and, therefore, the bead wind structure can effectively control a damage occurring from the terminal end a1e of the carcass ply, such as cord loosening. This structure also has the advantage of weight reduction, since the length of the turnup portion a1 is small. However, for tires having a bead wind structure, too, further weight reduction has been strongly demanded, for instance, by decreasing the rubber volume of the bead portions of tires.

On the other hand, tires having the bead wind structure show a relatively large bead deformation when contacting the ground as compared with tires having a non-bead-wind structure. In order to prevent the main portion a2 of the carcass ply "a" from falling down in the axially outward direction, it is known to reinforce the bead portion by disposing a bead reinforcing layer "c" having a U-shaped cross section in the bead portion. The thus disposed bead reinforcing layer is composed of a curved portion extending radially inward of the carcass turnup portion, and axially inner and outer portions extending radially outwardly from the curved portion. However, a shearing force greatly acts on the radially outer end c1e of the axially outer portion c1 of the bead reinforcing layer to damage the outer end c1e. The shearing force can be decreased by increasing the rubber volume of the bead portion at the outer end c1e to decrease the strain, but this results in increase in tire weight.

It is an object of the present invention to provide a heavy duty tire which can achieve weight reduction of the tire by reducing the weight of the bead portion while securing the bead durability.

This and other objects of the present invention will become apparent from the description hereinafter.

SUMMARY OF THE INVENTION

It has now been found that when soft rubbers having a low elasticity are used in a region surrounding the radially outer end c1e of the radially outwardly extending axially outer portion c1 of the bead reinforcing layer "c" to soften the region, that is to say, in at least a part of an axially inner rubber "gi" located between the main portion a2 of the carcass ply and the outer portion c1 of the bead reinforcing layer and in at least a part of an axially outer rubber "go" located between the outer portion c1 of the bead reinforcing layer and the outer surface of the tire, damage occurring from the radially outer end c1e of the axially outer portion c1 of the bead reinforcing layer can be prevented to secure the bead durability even if weight reduction is attempted by decreasing the axial thickness of the inner rubber "gi".

In accordance with the present invention, there is provided a heavy duty tire comprising a tread portion; a pair of sidewall portions; a pair of bead portions; a carcass ply which extends from the tread portion to each of bead cores of the bead portions through the sidewall portions and is turned up around the bead cores from the axially inward to the axially outward of the tire to form a pair of turnup portions and a carcass main portion therebetween, each of the turnup portions including a radially inner main part which is curved along the axially inner surface, radially inner surface and axially outer surface of the bead core and a radially outer sub-part which extends axially inwardly from the curved radially inner main part toward the carcass main portion in a region near the radially outer surface of the bead core with a gradient with respect to the radially outer surface of the bead core; a pair of bead reinforcing layers each including a curved portion which passes radially inward of the carcass turnup portion, an axially outer portion which is located on the axially outer side of the curved portion and extends radially outwardly from the curved portion, separating from the carcass turnup portion, with slightly slanting toward the axially outward of the tire, and an axially inner portion which is located on the axially inner side of the curved portion and extends radially outwardly from the curved portion along the axially inner surface of the carcass main portion, wherein the radial height of the axially outer portion of the bead reinforcing layer from the radially outer end thereof to a bead base line is from 25 to 40 mm, and the distance between the axially outer portion of the bead reinforcing layer and a point Pj on the carcass main portion apart from the radially outer surface of the bead core by a distance of 5 mm is from 14 to 20 mm; an axially inner rubber which is located between the carcass main portion and the axially outer portion of the bead reinforcing layer and which includes a first low modulus rubber portion having a complex elastic modulus $E*1$ of 3.0 to 6.0 MPa and adjacent to the axially outer portion of the bead reinforcing layer, wherein the thickness Ti of the axially inner rubber measured on a first base line drawn from the radially outer end of the axially outer portion of the bead reinforcing layer at right angles to the carcass main portion is from 7.0 to 13.0 mm and the ti/Ti ratio of a thickness ti of the first low modulus rubber portion on the first base line to the thickness Ti is at least 0.9; and an axially outer rubber which is located between the axially outer portion of the bead reinforcing layer and the axially outer surface of the tire and which includes a second low modulus rubber portion having a complex elastic modulus $E*2$ of 3.0 to 6.0 MPa and adjacent to the axially outer portion of the bead reinforcing layer, wherein the thickness To of the axially outer rubber measured on a second base line drawn from the radially outer end of the axially outer portion of the bead reinforcing layer at right angles to the axially outer surface of the tire is from 5.0 to 11.0 mm and the to/To ratio of a thickness to of the second low modulus rubber portion on the second base line to the thickness To is at least 0.4.

The axially inner rubber located between the carcass main portion and the axially outer portion of the bead reinforcing layer may be a bead apex rubber having a triangular cross section which is located radially outward of the radially outer sub-part of the carcass turnup portion and extends radially outwardly in a tapered manner. The bead apex rubber may be made of only the first low modulus rubber. The axially outer rubber located between the axially outer portion of the bead reinforcing layer and the axially outer surface of the tire may be a clinch rubber for preventing slippage of a rim which passes at least radially inward of the curved portion of the bead reinforcing layer to form a bead bottom and which further passes axially outward of the outer portion of the bead reinforcing layer and extends from the bead base line toward the radially outward of the tire in a tapered manner. At least a part of the radially outwardly extending portion of the clinch rubber is made of the second low modulus rubber and is disposed in contact with the outer portion of the bead reinforcing layer and the axially outer surface of the bead apex rubber.

In the specification, the "dimensions" of respective parts or portions of the tire denotes those measured under no loading in the standard state that the tire is mounted on a standard rim and inflated to an inner pressure of 50 kPa, unless otherwise noted. The term "standard rim" denotes a rim defined for every tire in a standardizing system on which the tire is based and, for example, is called "standard rim" in JATMA, "design rim" in TRA and "measuring rim" in ETRTO.

Further, the term "complex elastic modulus" as used herein denotes a value measured with a viscoelasticity spectrometer under the conditions of measuring temperature 70° C., frequency 10 Hz, initial strain 10% and dynamic strain ±1%.

DETAILED DESCRIPTION OF THE INVENTION

An embodiment of the present invention will now be explained with reference to the accompanying drawings.

Figure 1:
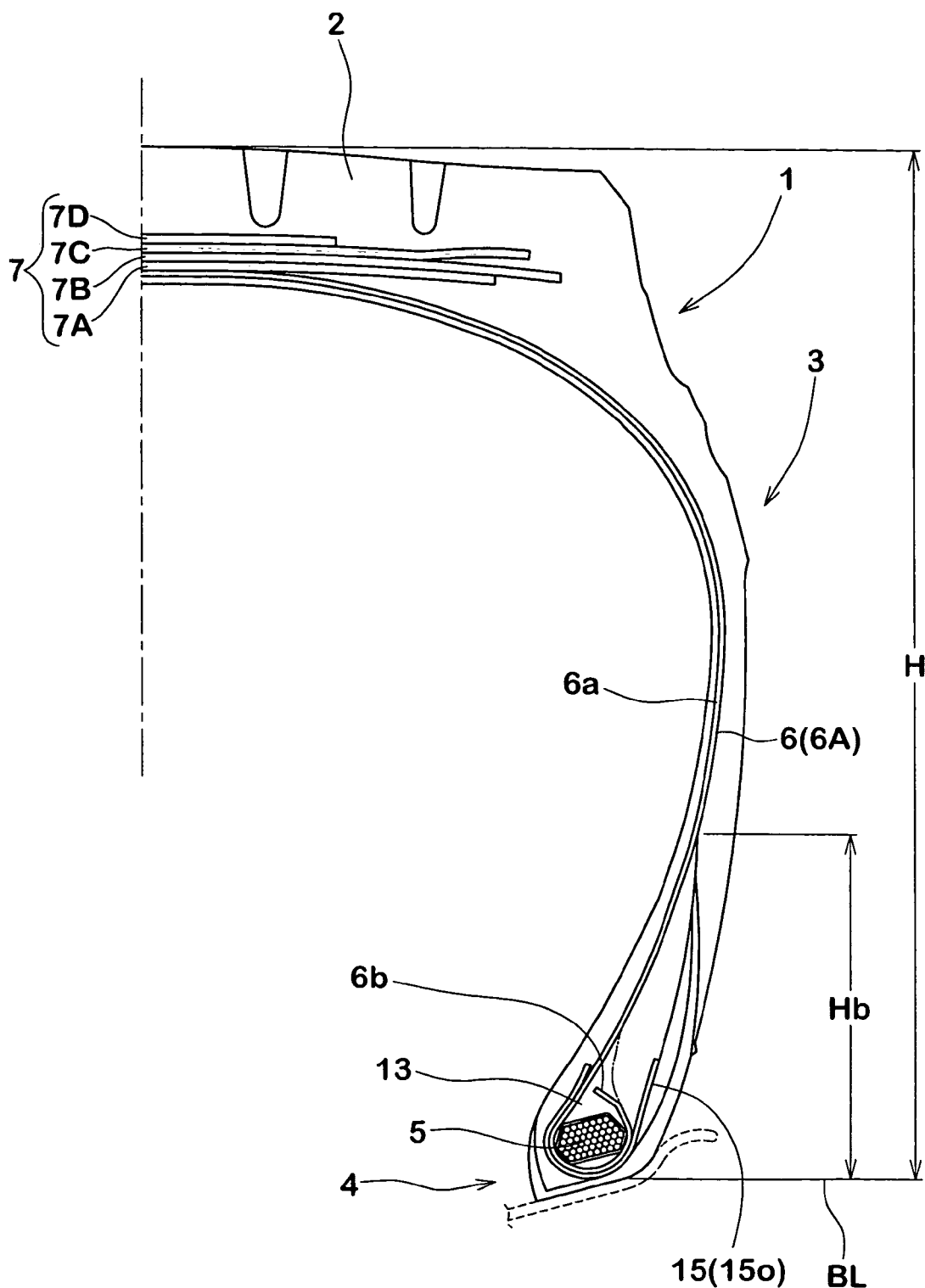
FIG. 1 is a cross sectional view of a heavy duty tire illustrating an embodiment of the present invention.

FIG. 1 is a cross sectional view illustrating a heavy duty tire of the present invention inflated to an inner pressure of 50 kPa. In FIG. 1, heavy duty tire 1 includes a carcass 6 that extends from a tread portion 2 to each of bead cores 5 in opposing bead portions 4 through sidewall portions 3, and a belt layer 7 that is disposed radially outward of the carcass 6 in the tread portion 2.

The belt layer 7 comprises at least two plies, usually three or more plies, of belt cords made of steel. The tire 1 according to the embodiment shown in FIG. 1 includes a belt layer 7 composed of four belt plies wherein disposed on the radially innermost side is a first belt ply 7A of belt cords arranged at an angle of, for instance, 60±15° with respect to the tire circumferential direction, and subsequently disposed radially outward of the first ply are second to fourth belt plies 7B, 7C and 7D of belt cords arranged at a small angle of, for instance, 10 to 35° with respect to the tire circumferential direction. The belt plies are stacked so that the belt cords in one ply crosses the cords in the other belt ply at least one point, whereby the rigidity of the belt is raised to reinforce the treat portion 2 by a hoop effect.

The carcass 6 comprises at least one carcass ply 6A (in this embodiment, one carcass ply) in which carcass cords made of steel are disposed at an angle of 75 to 90° with respect to the tire circumferential direction. The carcass ply 6A is composed of a toroidal main portion 6a that extends from one bead core 5 to the opposing bead core 5, passing through the crown region of the tire, and turnup portions 6b that extend from the both ends of the main portion 6a and are turned up around the bead cores 5 from the axially inside to the axially outside of the tire to thereby anchor the carcass ply.

Figure 2:
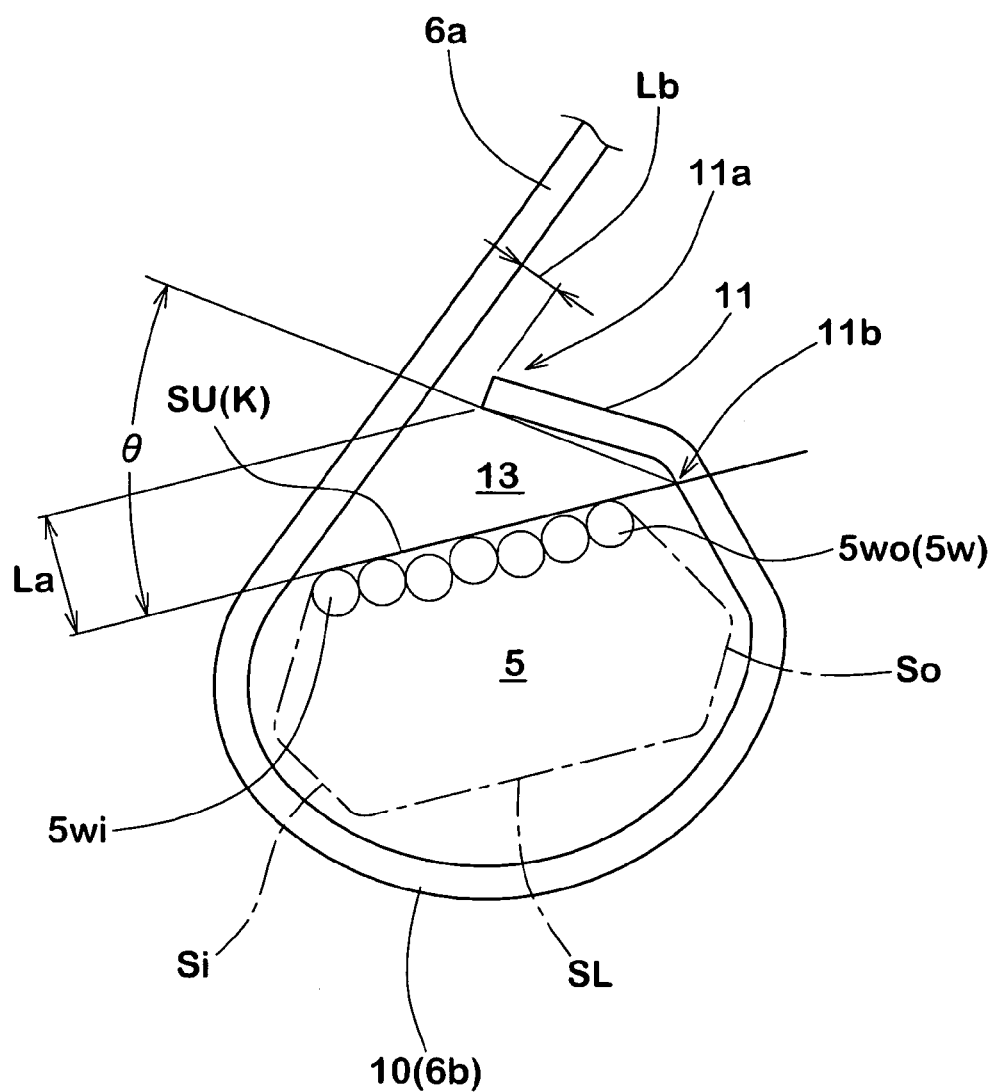
FIG. 2 is a cross sectional view illustrating a bead wind structure in a tread portion.
Figure 3:
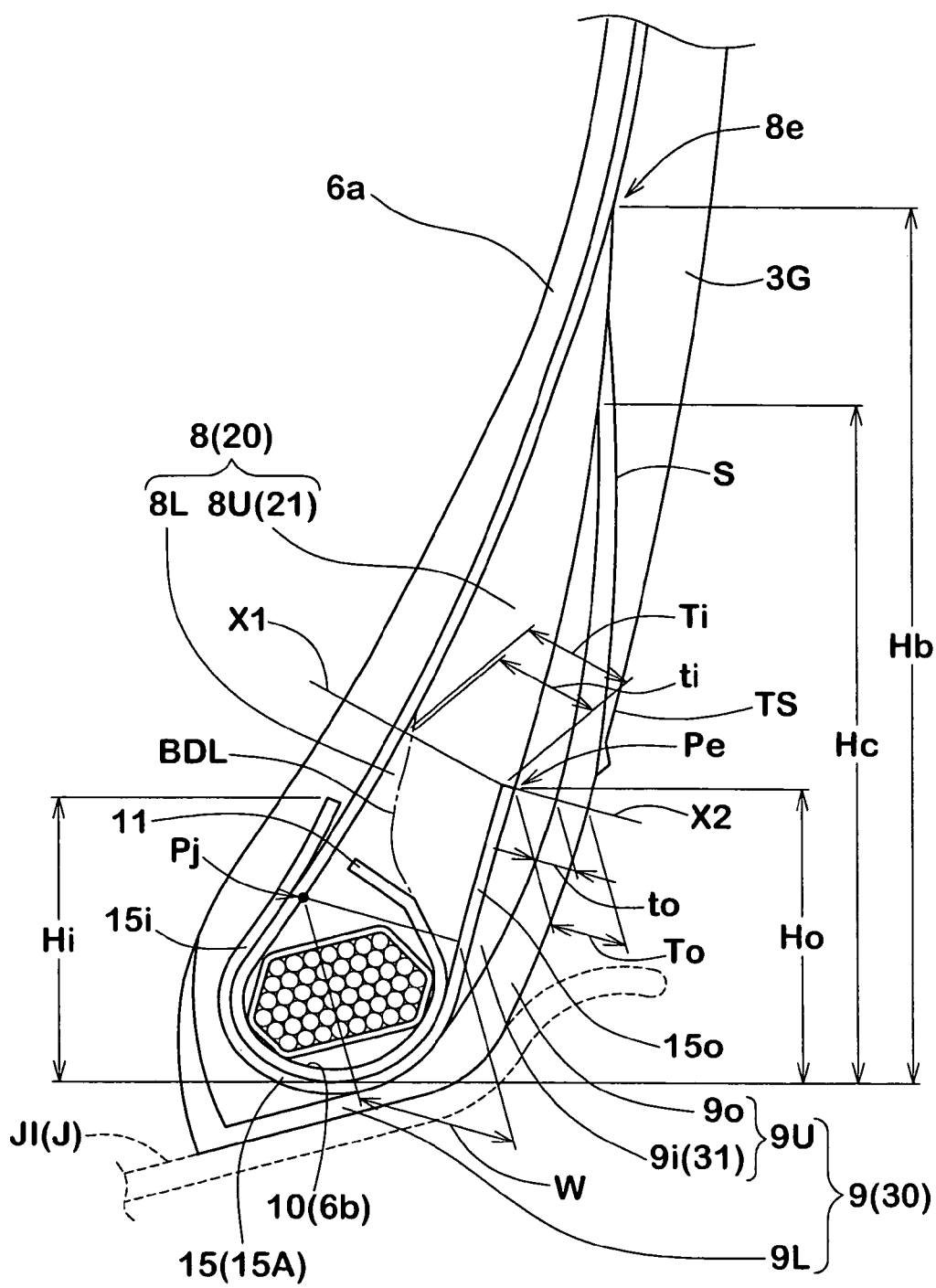
FIG. 3 is a partial enlarged cross sectional view illustrating a bead portion with a bead reinforcing layer in the tire shown in FIG. 1.

Each of the bead cores 5 comprises a ring body which is formed, for instance, by winding at least one bead wire 5w made of steel in rows and in multistage to have a predetermined cross sectional shape, e.g., a flat approximately hexagonal cross section as shown in FIGS. 1 and 2. The cross section of the bead core 5 may be in other shapes such as a flat rectangular shape and pentagon. The bead core 5 having a flat hexagonal cross section has a radially inner face SL which forms, in the cross section, a radially inner long side (downside in FIG. 2), a radially outer face SU which forms, in the cross section, a radially outer long side (upside in FIG. 2), an axially inner lateral face Si which forms, in the cross section, a kinked line-like bent side that joins the radially inner face SL and the radially outer face SU of the bead core 5 on the axially inside of the tire, and an axially outer lateral face So which forms, in the cross section, an opposing bent side. As shown in FIG. 3, the radially inner face SL of the bead core 5 extends approximately parallel to a bead seat surface J1 of a normal rim J, whereby the fitting force between the bead portion 4 and the bead seat surface J1 is raised over a wide range. The normal rim J is a 15° taper drop center rim for tubeless tires. Accordingly, in this embodiment, both of the inner face SL and the outer face SU of the bead core 5 incline at an angle of approximately 15° with respect to the tire axial direction. The "approximately 15°" means a value permitting an error in the manufacturing and is a value within the range of 15°±2°.

The tire 1 of the present invention has a bead wind structure wherein each of the turnup portions 6b of the carcass 6 is wound around the bead core 5 approximately one round. Thus, as shown in FIG. 2, the turnup portion 6b is composed of a radially inner main part 10 that curves along the axially inner lateral face Si, the radially inner face SL and the axially outer lateral face So of the bead core 5, and a radially outer sub-part 11 that continues from the main part 10 and extends with a gradient towards the carcass main portion 6a in a region near the radially outer face SU of the bead core 5. The sub-part 11 of the turnup portion 6b denotes a portion located radially outward of the outer face SU (or a tangential line that contacts the outer face SU) of the bead core 5, and it inclines in the direction that the distance from the radially outer face SU of the bead core 5 increases toward its tip 11a (in the direction of the axially inward of the tire).

The turnup portion 6b may be in contact with the axially outer edge of the radially outer face SU of the bead core 5 and the sub-part 11 thereof axially inwardly extends therefrom to form a predetermined angle θ with respect to the radially outer face SU or, as shown in FIG. 2, the main part 10 of the turnup portion 6b may separate from the axially outer lateral face So at the bent portion of the lateral face So to extend radially outwardly and axially inwardly and the sub-part 11 extends axially inwardly from a location apart from the axially outer edge of the radially outer face SU to form the predetermined angle θ with respect to the radially outer face SU. In the embodiment shown in FIG. 2, the turnup portion 6b is smoothly curved in an arc-like fashion without forming a bent portion and the sub-part 11 thereof extends axially inwardly from a location apart from the axially outer edge of the radially outer face SU of the bead core 5. A filling rubber 13 is disposed between the bead core 5 and the turnup portion 6b of the carcass 6. In particular, a filling rubber 13 having an approximately triangular cross section is disposed between the sub-part 11 of the turnup portion 6b and the radially outer face SU of the bead core 5.

The inclination angle θ (shown in FIG. 2) of the sub-part 11 with respect to the radially outer face SU of the bead core 5 is preferably at least 10°, more preferably at least 15°, since the degree of curving or bending of the carcass cords is moderately eased and molding eased and molding failure such as generation of voids resulting from spring back of the cords is prevented. If the angle θ is too large, the fastening force of the turnup portion 6b is weakened, so pulling out of the carcass ply may occur. Therefore, the angle θ is preferably at most 60°, more preferably at most 45°.

The terminal end 11a of the sub-part 11 of the carcass turnup portion 6b is preferably apart from the radially outer face SU of the bead core 5 by a distance La of 3 to 10 mm. If the distance La between the terminal end 11a and the outer face SU is less than 3 mm, the carcass cords of the sub-part 11 are more largely bent and accordingly the degree of curving or bending of the carcass cords cannot be sufficiently eased. Further, the terminal end 11a will receive a larger impact when a tire contacts a road and, therefore, the terminal end 11a is easily damaged. On the other hand, if the distance La exceeds 10 mm, a stress at the time of deformation of tire tends to strongly act on the terminal end 11a and, therefore, the terminal end 11a is easily damaged.

Preferably, the terminal end 11a of the sub-part 11 of the carcass turnup portion 6b terminates without contacting the carcass main portion 6a to form a clearance Lb. The distance Lb between the terminal end 11a and the carcass main portion 6a is preferably 1.0 mm or more so as to prevent the terminal end 11a from causing cord damages such as fretting wear by contact with the carcass main portion 6a. On the other hand, if the distance Lb exceeds 5.0 mm, the sub-part 11 is short and the fastening force to the bead core 5 will become insufficient, so the so-called pulling out tends to occur easily.

The angle θ mentioned above is, as shown in FIG. 2, an angle formed between the radially outer face SU (i.e., a tangential line K that contacts the outer face SU) of the bead core 5 and a straight line that connects the tip 11a and a radially lower end 11b of the sub-part 11 of the carcass turnup portion 6b (i.e., a point 11b where the turnup portion 6b crosses the tangential line K). In the case where bead wires 5w appearing in the cross section of the bead core 5 vary vertically in height in the tire radial direction and accordingly the radially outer face SU of the bead core 5 forms a non-flat surface, a tangential line K that contacts both the axially outermost bead wire 5wo and the axially innermost bead wire 5wi among the bead wires that appear on the radially outer face SU, is regarded as the line corresponding to the radially outer face SU. Similarly, with respect to the radially inner face SL, lateral face Si and lateral face So, each tangential line K that contacts the bead wires located at the both ends of the row of bead wires appearing in each face, namely the bead wires located at the respective corners of a polygon in cross section of the bead core, is regarded as the line corresponding to each of the faces SL, Si and So of the bead core 5.

The filling rubber 13 is made of a low modulus rubber composition having an excellent effect of easing impact or stress. Thus, the filling rubber 13 serves to absorb a strain which generates at the terminal end 11a of the sub-part 11 of the carcass turnup portion 6b, to prevent damage of the terminal end 11a. A rubber composition having a complex elastic modulus $E^*3$ of 5 to 15 MPa is preferred as the filling rubber 13. If the complex elastic modulus $E^*3$ is less than 5 MPa, the filling rubber 13 is excessively soft and a strain at the terminal end 11a tends to become large. If the complex elastic modulus $E^*3$ is more than 15 MPa, the filling rubber 13 becomes poor in flexibility to lower the effect of easing and absorbing a strain. From such points of view, the lower limit of the complex elastic modulus $E^*3$ of the filling rubber 13 is preferably set to 6 MPa or more, especially 7 MPa or more, and the upper limit of the complex elastic modulus $E^*3$ is preferably set to 13 MPa or less, especially 11 MPa or less.

Tires having a bead wind structure generally tends to be inferior in cornering power since the rigidity in the bead portion is smaller as compared with conventional tires having a non-bead-wind structure. Therefore, a bead reinforcing layer 15 is disposed in the bead portion 4 in order to enhance the bead rigidity. The bead reinforcing layer 15 comprises a ply of steel cords arranged in an inclined fashion, for instance, at an angle of 15 to 60° with respect to the tire circumferential line. The bead reinforcing layer 15 has an approximately U-shaped cross section and, as shown in FIG. 3, includes a curved intermediate portion 15A that passes radially inward of the turnup portion 6b of the carcass ply along the main portion 10 of the turnup portion 6b, an axially outer portion 15o that is located axially outward of the curved portion 15A and straightly extends toward the radially outward of the tire apart from the main part 10 of the turnup portion 6b with slightly slanting toward the axially outward of the tire, and an axially inner portion 15i that is located axially inward of the curved portion 15A and radially outwardly extends along the axially inner surface of the main portion 6a of the carcass ply 6A.

The height Ho in the tire radial direction of the axially outer portion 15o from a bead base line BL to the radially outer end Pe of the outer portion 15o is within the range of 25 to 40 mm. If the radial height Ho is less than 25 mm, a necessary reinforcing effect cannot be obtained. On the other hand, if the radial height Ho is more than 40 mm, the radially outer end Pe approaches a sidewall portion 3 to excess where deformation is large, so a damage starting from the radially outer end Pe generates due to concentration of excess shearing stress to the outer end Pe. Since the axially inner portion 15i of the bead reinforcing layer 15 is adjacent to the main portion 6a of the carcass ply and protected thereby, the tip of the inner portion 15i is hard to be damaged as compared with the outer portion 15o. Therefore, the radial height Hi of the inner portion 15i can be made larger than the radial height Ho. However, from the viewpoint of ride comfort and weight reduction, it is preferable that the radial height Hi is smaller than the radial height Ho.

In the present invention, specific low modulus rubbers are disposed axially inward and axially outward of the outer portion 15o of the bead reinforcing layer 15 at least so as to surround the radially outer end Pe of the outer portion 15o, preferably so as to cover both the axially inner surface and the axially outer surface of the outer portion 15o. In a preferable embodiment as shown in FIG. 3, a low modulus rubber 21 disposed axially inward of the outer portion 15o extends from a location corresponding to a radially lower end of the outer portion 15o over the radially upper end Pe of the outer portion 15o in a tapered fashion. A low modulus rubber 31 disposed axially outward of the outer portion 15o is disposed so as to cover the axially outer surface of the outer portion 15o and a part of the axially outer surface of the low modulus rubber 21 which extends from the tip Pe.

(1) An axially inner rubber 20 located between the carcass main portion 6a and the outer portion 15o of the bead reinforcing layer 15 includes the low modulus rubber portion 21 and has a decreased thickness as compared with conventional tires such that the thickness Ti measured on a first base line X1 drawn from the radially outer end Pe of the outer portion 15o at right angles to the carcass main portion 6a is from 7.0 to 13.0 mm. The low modulus rubber portion 21 comprises a low modulus rubber having a complex elastic modulus $E^*1$ of 3.0 to 6.0 MPa and is disposed adjacent to the outer portion 15o of the bead reinforcing layer. The ratio ti/Ti of the thickness ti of the low modulus rubber portion 21 on the first base line X1 to the thickness Ti of the axially inner rubber 20 is from 0.9 to 1.0.

(2) An axially outer rubber 30 located between the outer portion 15o of the bead reinforcing layer 15 and the axially outer surface TS of the tire includes the low modulus rubber portion 31 and has a thickness such that the thickness To measured on a second base line X2 drawn from the radially outer end Pe of the outer portion 15o at right angles to the axially outer surface TS of the tire is from 5.0 to 11.0 mm. The low modulus rubber portion 31 comprises a low modulus rubber having a complex elastic modulus $E^{*}2$ of 3.0 to 6.0 MPa and is disposed adjacent to the outer portion 15o of the bead reinforcing layer 15. The ratio to/To of the thickness "to" of the low modulus rubber portion 31 on the second base line X2 to the thickness To of the axially outer rubber 30 is at least 0.4, especially from 0.4 to less than 1.0, preferably 0.4 to 0.9.

The low modulus rubber portions 21 and 31 both are adjacent to the outer portion 15o of the bead reinforcing layer 15, extend radially outwardly and cover the axially inner and outer surface of the outer portion 15o to protect the tip Pe of the outer portion 15o.

In the embodiment shown in FIG. 3, the axially inner rubber 20 is constituted by a bead apex rubber 8, and the axially outer rubber 30 is constituted by a clinch rubber 9 for preventing slippage of a rim.

The bead apex rubber 8 is a component having a triangular cross section which is located between the carcass main portion 6a and the axially outer portion 15o of the bead reinforcing layer 15 and extends from the radially outer surface of the sub-part 11 of the carcass turnup portion 6b in a tapered manner. The height Hb from the bead base line BL to the tip 8e of the bead apex rubber 8 is larger than the height Ho of the outer portion 15o of the bead reinforcing layer. From the viewpoint of ride comfort, the height Hb is preferably set to 40% or less of the height H in cross section of the tire 1 (shown in FIG. 1). The bead apex rubber 8 shown in FIG. 3 is composed of an axially inner apex portion 8L and an axially outer apex portion 8U which are defined by a boundary line BDL extending from a location near the inner end of the sub-part 11 of the carcass turnup portion to the carcass main portion 6a. The axially outer apex portion 8U is formed by the above-mentioned low modulus rubber portion 21 having a complex elastic modulus $E^{*}1$ of 3.0 to 6.0 MPa. Preferably, the axially inner apex portion 8L is formed from a high modulus rubber having a complex elastic modulus $E^{*}4$ of 30 to 70 MPa to enhance the bead rigidity. The bead apex rubber 8 may be made of only the low modulus rubber.

The clinch rubber 9 is a component for preventing slippage of a rim, which forms the skin of the bead portion 4. The clinch rubber 9 extends radially outwardly at least from a height level corresponding to the bead base line BL, passing through axially outward of the outer portion 15o of the bead reinforcing layer. In the embodiment shown in FIG. 3, the clinch rubber 9 is composed of a base portion 9L which forms a bead bottom, and a clinch main portion 9U which is continuous with the base portion 9L and forms the axially outer surface TS of the tire. The clinch main portion 9U extends radially outwardly in contact with the axially outer surface of the outer portion 15o of the bead reinforcing layer up to the tip Pe of the outer portion 15o and further extends radially outwardly in contact with the axially outer surface of the axially outer apex portion 8U, and it terminates at a location radially below the tip 8e of the axially outer apex portion 8U so that a radially upper end portion of the axially outer apex portion 8U comes into contact with a sidewall rubber 3G. The axially outer surface of the axially outer apex portion 8U extends radially outwardly from the tip Pe of the outer portion 15o of the bead reinforcing layer. A radially upper end portion of the clinch main portion 9U is in contact with the sidewall rubber 3G which constitutes the skin of the sidewall 3. The contacting surface S of the clinch main portion 9U with the sidewall rubber 3G extends radially outwardly from the axially outer surface TS of the tire to the axially outer surface of the axially outer apex portion 8U.

The clinch main portion 9U is composed of an axially inner layer 9i which is contiguous to the outer portion 15o of the bead reinforcing layer and, in a region radially above the tip Pe of the outer portion 15o, subsequently contiguous to the axially outer apex portion 8U, and an axially outer layer 9o which forms the axially outer surface TS of the tire. The axially inner layer 9i is formed by the above-mentioned low modulus rubber portion 31 having a complex elastic modulus $E^{*}2$ of 3.0 to 6.0 MPa. The height Hc in the tire radial direction of the axially inner layer 9i from the bead base line BL is preferably from 1.2 to 2.0 times the height Ho of the outer portion 15o of the bead reinforcing layer. Preferably, the axially outer layer 9o and the clinch base portion 9L are formed from a rubber having a good wear resistance which has a complex elastic modulus $E^{*}5$ of 9.0 to 15.0 MPa.

As stated above, in the present invention, the thickness of the axially inner rubber 20 is decreased as compared with conventional tires to make the bead portion 4 thin by setting the thickness Ti of the inner rubber 20 measured on the first base line X1 within the range of 7.0 to 13.0 mm, thereby achieving weight reduction. On the other hand, low modulus rubber portions 21 and 31 are provided in the axially inner rubber 20 and the axially outer rubber 30, whereby the outer portion 15o of the bead reinforcing layer and its terminal end Pe are covered and protected from both the axially inner and outer sides to ease the shearing force which acts on the terminal end Pe. Thus, damages such as cord loosening starting from the terminal end Pe can be prevented to enhance the bead durability, while achieving the weight reduction.

If the complex elastic modulus $E^{*}1$ and $E^{*}2$ of the inner rubber 20 and the outer rubber 30 are less then 3.0 MPa, bead deformation becomes large to increase the shearing force, and if more than 6.0 MPa, the shearing force is not sufficiently eased. Thus, in these cases, the bead durability-enhancing effect of the inner and outer rubbers 20 and 30 is not exhibited.

From the viewpoint of a shearing force-easing effect, it is preferable that the difference "$E^{*}1-E^{*}2$" is 3.0 MPa or less, and it is more preferable that the inner rubber 20 and the outer rubber 30 have the same complex elastic modulus.

If the thickness Ti of the inner rubber 20 is less than 7.0 mm or if the thickness To of the outer rubber 30 is less than 5.0 mm, bead deformation becomes too large to enhance the bead durability by the use of low modulus rubbers 21 and 31. It is also disadvantageous for steering stability. If the thickness Ti is more than 13.0 mm or if the thickness To is more than 11.0 mm, weight reduction is not achieved. From such points of view, it is preferable that the thickness Ti of the inner rubber 20 is not less than 9.0 mm and not more than 15.0 mm, and it is preferable that the thickness To of the outer rubber 30 is not less than 10 mm and not more than 13.0 mm.

If the ti/Ti ratio is less than 0.9 or if the to/To ratio is less than 0.4, the shearing force-easing effect is not sufficient and accordingly enhancement of the bead durability is not achieved. The upper limit of the ti/Ti ratio is 1.0. Therefore, for instance, the inner apex portion 8L can be disposed in a region located radially inward of the first base line X1 provided that the boundary line BDL extends from the inner end of the sub-part 11 of the carcass turnup portion 6b. The bead apex rubber 8 may be composed of only the outer apex portion 8U. The upper limit of the ti/Ti ratio is preferably 0.9.

It is preferable that the ratio To/Ti of the thickness To of the outer rubber 30 and the thickness Ti of the inner rubber 20 is from 0.6 to 0.9, since the terminal end Pe of the outer portion 15o of the bead reinforcing layer approaches the neutral line of a stress in flexural deformation and it serves to decrease the stress acting on the terminal end Pe.

In tire 1 as shown in FIG. 3, the distance W from a point Pj, which is located on the carcass main portion 6a apart from the radially outer surface SU of the bead core 5 by a distance of 5 mm, to the outer portion 15o of the bead reinforcing layer 6b is from 14 to 20 mm. If the distance W is less than 14 mm, the bead rigidity is small and therefore the steering stability becomes insufficient. If the distance W is more than 20 mm, the bead portion 4 becomes unnecessarily large to result in useless weight increase. From the viewpoint of balance between bead rigidity and weight reduction in bead portion, it is preferable that the ratio Ti/W of the thickness Ti of the inner rubber 20 to the width W is from 0.5 to 0.8.

While a preferable embodiment of the present invention has been described with reference to the drawings, it goes without saying that the present invention is not limited to only such an embodiment and various changes and modifications may be made. The present invention is more specifically described and explained by means of the following examples and comparative examples. It is to be understood that the present invention is not limited to these examples.

EXAMPLES 1 TO 9 AND COMPARATIVE EXAMPLES 1 to 4

Heavy duty tires (size: 11R22.5) having the structure shown in FIG. 1 were manufactured based on the specifications shown in Table 1, and the bead durability thereof was tested by the method described below.

These tires excepting a tire of Control had a bead wind structure as shown in FIG. 2. In the bead wind structure, the angle θ of the sub-part 11 of the carcass turnup portion 6b was 15°, the distance La (height of the tip 11a of the sub-part 11 from the radially outer surface SU of the bead core) was 4.0 mm, the distance Lb (clearance between the tip 11a and the carcass main portion 6a) was 2.0 mm, and the complex elastic modulus $E*3$ of the filling rubber 13 disposed between the sub-part 11 and the outer surface SU of the bead core was 6.0 MPa. These parameters were the same for all tires prepared in the Examples and the Comparative Examples.

Figure 4:
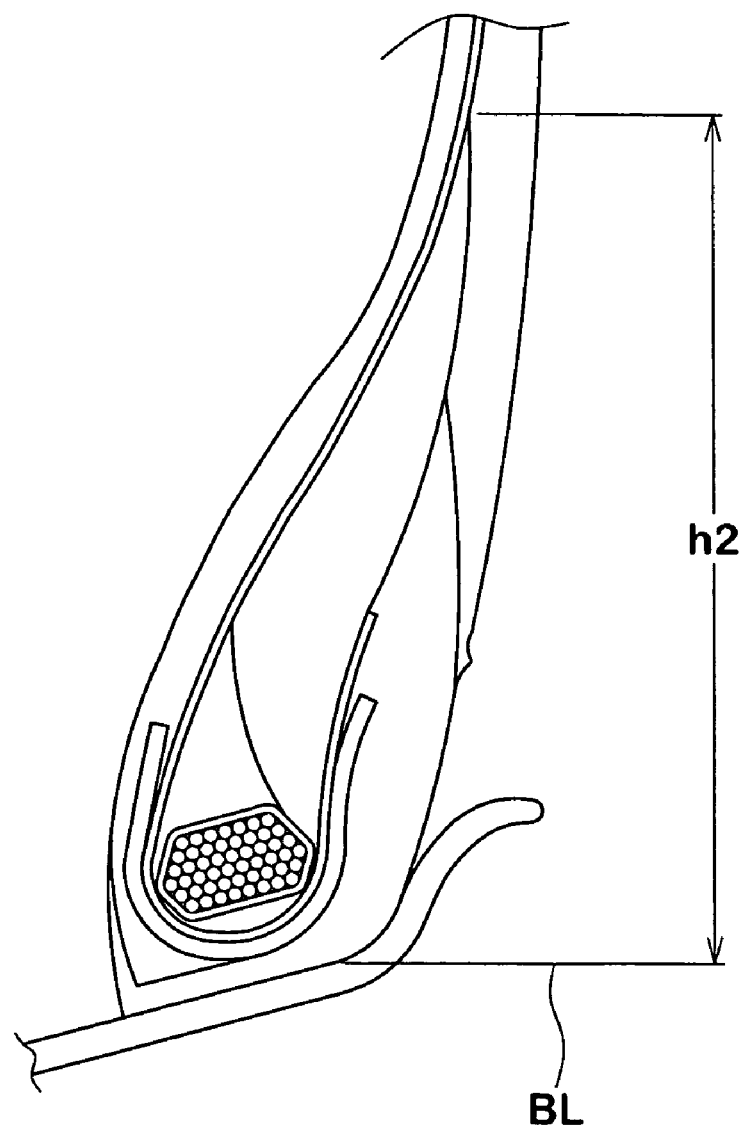
FIG. 4 is a cross sectional view illustrating a conventional bead structure in which a turned-up end portion of a carcass ply is not wound around a bead core.
Figure 5:
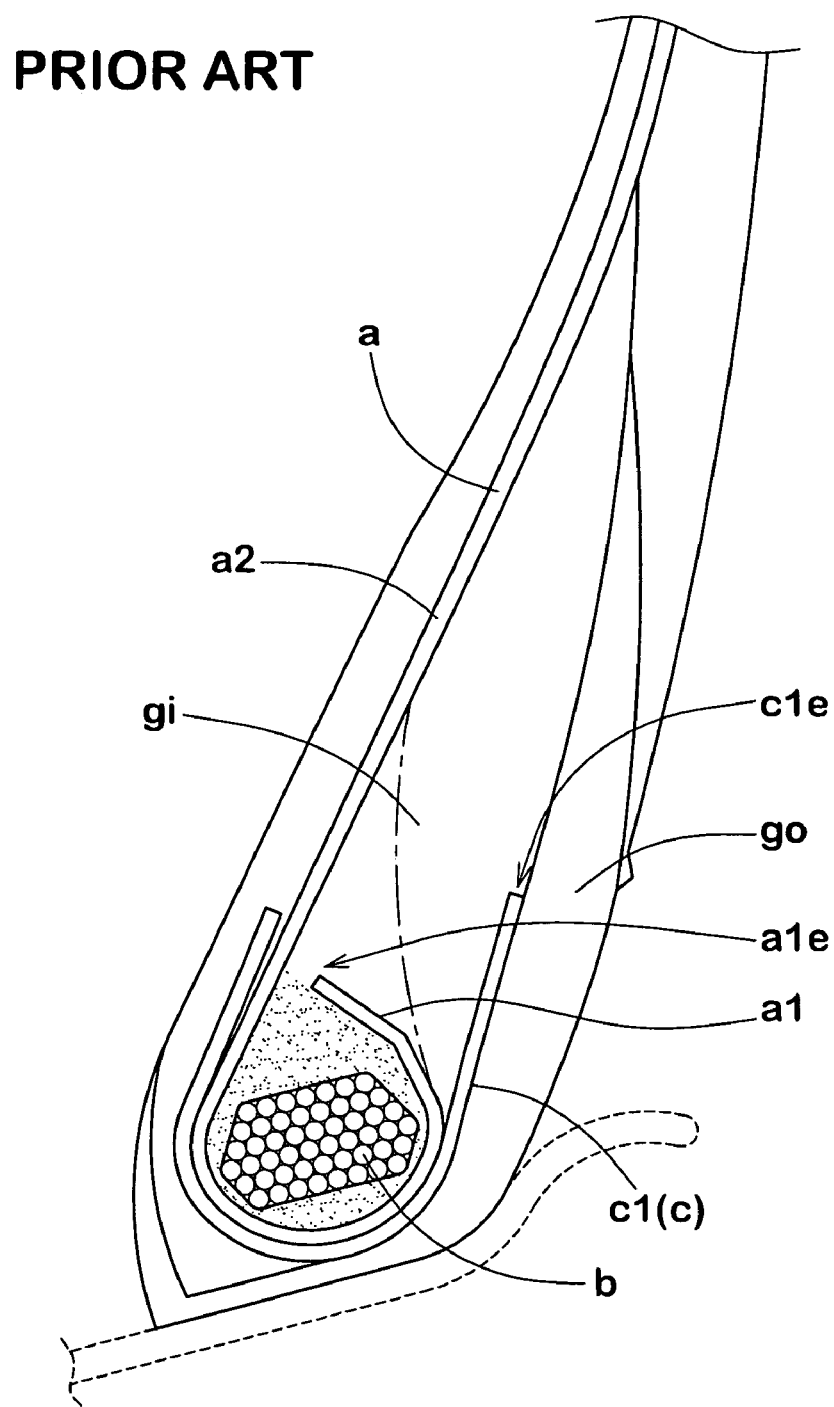
FIG. 5 is a cross sectional view illustrating a conventional bead portion having a bead wind structure.

Control shows a tire having a non-bead-wind structure as shown in FIG. 4 wherein an end portion of the carcass ply is turned up in a U-shape to extend along the axially outer surface of the bead apex rubber 8 having a height h2 of 65 mm and the height of the turnup end from the bead base line BL is 35 mm.

Bead Durability

A tire was run on a drum of a drum tester under conditions of rim 7.50×22.5, inner pressure 700 kPa, tire load 26.72 kN×3 and speed 30 km/h. The running time up to generation of damages in the bead portion was measured. The results are shown as an index based on the result of Control regarded as 100. The larger the value, the better the durability.

Test results are shown in Table 1.

TABLE 1

| Bead structure | Ex. 1 | Ex. 2 | Ex. 3 | Ex. 4 | Ex. 5 | Ex. 6 | Ex. 7 |
|---|---|---|---|---|---|---|---|
| | Bead wind (FIG. 2) | Bead wind (FIG. 2) | Bead wind (FIG. 2) | Bead wind (FIG. 2) | Bead wind (FIG. 2) | Bead wind (FIG. 2) | Bead wind (FIG. 2) |
| Bead reinforcing layer | | | | | | | |
| Height Ho of axially outer portion (mm) | 32 | 32 | 32 | 32 | 32 | 32 | 27 |
| Distance W in bead portion (mm) | 17 | 17 | 17 | 17 | 17 | 15 | 17 |
| Bead apex rubber | | | | | | | |
| Height Hb (mm) | 65 | 65 | 65 | 65 | 65 | 65 | 65 |
| Inner apex portion | no | yes | no | no | no | yes | no |
| Complex elastic modulus $E*4$ (MPa) | — | 50 | — | — | — | 50 | — |
| Outer apex portion | yes | yes | yes | yes | yes | yes | yes |
| Complex elastic modulus $E*1$ (MPa) | 3.5 | 3.5 | 3.5 | 3.5 | 3.5 | 3.5 | 3.5 |
| Thickness Ti of bead apex (mm) | 10 | 10 | 10 | 10 | 10 | 7.5 | 10 |
| Thickness ti of outer apex (mm) | 10 | 9 | 10 | 10 | 10 | 7.0 | 10 |
| Ratio ti/Ti | 1.0 | 0.9 | 1.0 | 1.0 | 1.0 | 0.93 | 1.0 |
| Clinch rubber | | | | | | | |
| Axially inner layer | yes | yes | yes | yes | yes | yes | yes |
| Complex elastic modulus $E*2$ (MPa) | 3.5 | 3.5 | 3.5 | 3.5 | 3.5 | 3.5 | 3.5 |
| Axially outer layer | yes | yes | yes | yes | no | yes | yes |
| Complex elastic modulus $E*5$ (MPa) | 10 | 10 | 10 | 10 | 10 | 10 | 10 |
| Thickness To of clinch rubber (mm) | 8 | 8 | 8 | 8 | 8 | 6 | 8 |
| Thickness "to" of inner layer (mm) | 7.2 | 7.2 | 3.2 | 5.6 | 8 | 6 | 7.2 |
| Ratio to/To | 0.9 | 0.9 | 0.4 | 0.7 | 1.0 | 1.0 | 0.9 |
| Weight of bead apex rubber | 60 | 60 | 60 | 60 | 60 | 45 | 60 |
| Bead durability | 140 | 135 | 130 | 125 | 150 | 125 | 130 |

TABLE 1-continued

| Bead structure | Ex. 8 | Ex. 9 | Control | Com. Ex. 1 | Com. Ex. 2 | Com. Ex. 3 | Com. Ex. 4 |
|---|---|---|---|---|---|---|---|
| | Bead wind (FIG. 2) | Bead wind (FIG. 2) | Non-bead wind (FIG. 4) | Bead wind (FIG. 2) | Bead wind (FIG. 2) | Bead wind (FIG. 2) | Bead wind (FIG. 2) |
| Bead reinforcing layer | | | | | | | |
| Height Ho of axially outer portion (mm) | 32 | 32 | 25 | 32 | 32 | 32 | 32 |
| Distance W in bead portion (mm) | 17 | 17 | 15 | 17 | 17 | 17 | 17 |
| Bead apex rubber | | | | | | | |
| Height Hb (mm) | 65 | 65 | 65 | 65 | 65 | 65 | 65 |
| Inner apex portion | no | no | yes | yes | no | no | no |
| Complex elastic modulus E*4 (MPa) | — | — | 50 | 50 | — | — | — |
| Outer apex portion | yes | yes | yes | yes | yes | yes | yes |
| Complex elastic modulus E*1 (MPa) | 6.0 | 3.0 | 3.5 | 3.5 | 3.5 | 7 | 2 |
| Thickness Ti of bead apex (mm) | 10 | 10 | 15 | 15 | 15 | 10 | 10 |
| Thickness ti of outer apex (mm) | 10 | 10 | 13.5 | 10.5 | 10 | 10 | 10 |
| Ratio ti/Ti | 1.0 | 1.0 | 0.9 | 0.7 | 1.0 | 1.0 | 1.0 |
| Clinch rubber | | | | | | | |
| Axially inner layer | yes | yes | yes | yes | no | yes | yes |
| Complex elastic modulus E*2 (MPa) | 6.0 | 3.0 | 3.0 | 3.0 | — | 7 | 2 |
| Axially outer layer | yes | yes | yes | yes | yes | yes | yes |
| Complex elastic modulus E*5 (MPa) | 10 | 10 | 10 | 10 | 10 | 10 | 10 |
| Thickness To of clinch rubber (mm) | 8 | 8 | 8 | 8 | 8 | 8 | 8 |
| Thickness "to" of inner layer (mm) | 7.2 | 7.2 | 7.2 | 7.2 | 0 | 8.0 | 8.0 |
| Ratio to/To | 0.9 | 0.9 | 0.9 | 0.9 | 0 | 1.0 | 1.0 |
| Weight of bead apex rubber | 60 | 60 | 100 | 100 | 60 | 60 | 60 |
| Bead durability | 125 | 145 | 100 | 120 | 80 | 95 | 95 |

What is claimed is:

1. A heavy duty tire comprising:

a tread portion;

a pair of sidewall portions;

a pair of bead portion each with a bead core;

a carcass ply which extends between the bead portions through the tread portion and the sidewall portions and is turned up around the bead cores from the axially inward to the axially outward of the tire to form a pair of turnup portions and a carcass main portion therebetween, each of the turnup portions including a radially inner main part which is curved along the axially inner surface, radially inner surface and axially outer surface of the bead core, and a radially outer sub-part which extends axially inwardly from the curved radially inner main part toward the carcass main portion in a region near the radially outer surface of the bead core with a gradient with respect to the radially outer surface of the bead core;

a bead reinforcing layer disposed in each of the bead portions, and including a curved portion which passes radially inward of the carcass turnup portion, an axially outer portion which is located on the axially outer side of the curved portion and extends radially outwardly from the curved portion, separating from the carcass turnup portion, with slightly slanting toward the axially outward of the tire, and an axially inner portion which is located on the axially inner side of the curved portion and extends radially outwardly from the curved portion along the axially inner surface of the carcass main portion, wherein the radial height of the axially outer portion of the bead reinforcing layer from the radially outer end thereof to a bead base line is from 25 to 40 mm, and the distance between the axially outer portion of the bead reinforcing layer and a point on the carcass main portion apart from the radially outer surface of the bead core by a distance of 5 mm is from 14 to 20 mm;

an axially inner rubber disposed between the carcass main portion and the axially outer portion of the bead reinforcing layer in each of the bead portions, the axially inner rubber including a portion made of a first low modulus rubber having a complex elastic modulus E*1 of 3.0 to 6.0 MPa and disposed on the axially inside of the axially outer portion of the bead reinforcing layer, wherein said portion made of the first low modulus rubber extends radially outwardly beyond the radially outer end of the axially outer portion, the thickness Ti of the axially inner rubber measured along a first base line drawn from the radially outer end of the axially outer portion of the bead reinforcing layer at a right angle with respect to the carcass main portion is from 7.0 to 13.0 mm, and the ratio ti/Ti of a thickness ti of the first low modulus rubber portion measured along the first base line to the thickness Ti is at least 0.9; and an axially outer rubber which is located between the axially outer portion of the bead reinforcing layer and the axially outer surface of the tire, the axially outer rubber including an axially inner layer made of a second low modulus rubber having a complex elastic modulus E*2 of 3.0 to 6.0 MPa and disposed axially outside of the axially outer portion of the bead reinforcing layer, and an axially outer layer made of a higher modulus rubber having a complex elastic modulus E*5 of 9.0 to 15.0 MPa and disposed axially outside of the axially inner layer to define a part of the outer surface of the tire, wherein the axially inner layer extends radially outwardly beyond the radially outer end of the axially outer portion, whereby the radially outer end of the axially outer portion is sandwiched between the portion made of the first low modulus rubber and the axially inner layer made of the second low modulus rubber, the axially outer layer extends radially outwardly from the bead bottom so as to cover the axially outer surface of the axially inner layer, the thickness To of the axially outer rubber measured along a second base line drawn from the radially outer end of the axially outer portion of the bead reinforcing layer at a right angle with respect to the axially outer surface of the tire is from 5.0 to 11.0 mm, and the ratio to/To of a thickness to of the axially inner layer measured along the second base line to said thickness To is at least 0.4.

2. The heavy duty tire of claim 1, wherein the axially inner rubber disposed radially outside of the said sub-part is made of only the first low modulus rubber.

3. The heavy duty tire of claim 1, wherein the ratio To/Ti of the thickness To of the axially outer rubber to the thickness Ti of the axially inner rubber is from 0.6 to 0.9.

4. The heavy duty tire of claim 1, wherein the axially outer layer extends to the bead toe, defining the bead bottom surface.

5. The heavy duty tire of claim 1, wherein a filling rubber having a complex elastic modulus of 5 to 15 MPa is disposed between the radially outer surface of the bead core and the sub-part of the carcass turnup portion.

6. The heavy duty tire of claim 5, wherein the axially inner rubber comprises an axially inner apex portion made of a high modulus rubber having a complex elastic modulus of 30 to 70 MPa and disposed radially outside of the axially inner end portion of a sub-part portion of a carcass turnup portion, whereby the axially inner terminal end of the sub-part portion is sandwiched between the axially inner portion and said filling rubber.

7. The heavy duty tire of claim 6, wherein the axially inner portion extends radially outwardly along the axially outer surface of the carcass main portion in a tapered manner and terminates near but slightly radially outward of the first base line.

8. The heavy duty tire of claim 1, wherein the axially inner layer extends radially inwardly along the axially outer surface of the axially outer portion of the bead reinforcing layer in a tapered manner and terminates on the axially outer side of the bead core.

* * * * *